(12) United States Patent
Chang

(10) Patent No.: US 8,607,527 B2
(45) Date of Patent: Dec. 17, 2013

(54) ECOLOGICAL GREENING WALL AND CONSTRUCTION METHOD THEREOF

(76) Inventor: Yushun Chang, Guangdong (CN)

( * ) Notice: Subject to any disclaimer, the term of this patent is extended or adjusted under 35 U.S.C. 154(b) by 46 days.

(21) Appl. No.: 13/519,612

(22) PCT Filed: Jun. 13, 2010

(86) PCT No.: PCT/CN2010/073918
§ 371 (c)(1),
(2), (4) Date: Jun. 28, 2012

(87) PCT Pub. No.: WO2011/079580
PCT Pub. Date: Jul. 7, 2011

(65) Prior Publication Data
US 2012/0317922 A1  Dec. 20, 2012

(30) Foreign Application Priority Data

Jan. 1, 2010 (CN) .......................... 2010 1 0003029

(51) Int. Cl.
*E04B 1/00* (2006.01)
*A01G 9/02* (2006.01)
(52) U.S. Cl.
USPC ........................ 52/745.09; 47/65.9; 47/65.8
(58) Field of Classification Search
USPC ........... 52/302.1, 302.3, 408, 745.05, 745.09, 52/745.21, 746.1; 47/65.9, 65.8
See application file for complete search history.

(56) References Cited

U.S. PATENT DOCUMENTS

| | | | | |
|---|---|---|---|---|
| 4,785,577 A * | 11/1988 | Lederbauer | | 47/33 |
| 4,961,284 A * | 10/1990 | Williams | | 47/66.5 |
| 5,257,476 A | 11/1993 | Fukuzumi | | |
| 5,287,650 A * | 2/1994 | Moriguchi et al. | | 47/59 R |
| 5,579,603 A * | 12/1996 | Fukuzumi | | 47/58.1 R |
| 5,836,129 A * | 11/1998 | Jaecklin | | 52/612 |
| 5,921,020 A * | 7/1999 | Avidan | | 47/4 |
| 6,725,601 B2 * | 4/2004 | Chick | | 47/83 |
| 7,627,983 B1 * | 12/2009 | Deutsch-Aboulmahassine | | 47/83 |
| 7,814,703 B2 * | 10/2010 | Irwin | | 47/65.9 |
| 7,921,599 B2 * | 4/2011 | Irwin | | 47/66.1 |
| 8,250,804 B2 * | 8/2012 | Chang | | 47/39 |
| 8,365,466 B1 * | 2/2013 | Storey | | 47/62 C |

(Continued)

FOREIGN PATENT DOCUMENTS

CN  101220581 A  7/2008
CN  101538900 A  9/2009

(Continued)

*Primary Examiner* — Mark Wendell
*Assistant Examiner* — Keith Minter
(74) *Attorney, Agent, or Firm* — Fulbright & Jaworski LLP

(57) ABSTRACT

An ecological greening wall and a construction method thereof are provided. The ecological greening wall comprises a plurality of fixed poles (2) arranged at intervals on the ground (1), and a reinforcement (3) with openings is fixedly connected between the fixed poles (2) and arranged along the fixed poles (2) in a vertical direction. Stacked vegetation bags (4) for greening are provided on at least one side of the reinforcement (3), and each includes a breathable and permeable bag body (41) and a vegetation base material (42) filled in the bag body (41). The bag body (41) and the reinforcement (3) are fixedly connected together by a reinforcing wall (6) so as to form a whole body by the reinforcing wall (6), the reinforcement (3) and the vegetation bag (4). The ecological greening wall has a simple and firm structure, and it is easy to be constructed.

10 Claims, 7 Drawing Sheets

(56) References Cited

U.S. PATENT DOCUMENTS

| | | | |
|---|---|---|---|
| 2007/0199241 A1* | 8/2007 | Peleszezak | 47/65.9 |
| 2008/0120904 A1* | 5/2008 | Takahashi et al. | 47/65.8 |
| 2011/0059518 A1* | 3/2011 | Bribach et al. | 435/266 |
| 2011/0215937 A1* | 9/2011 | Carroll et al. | 340/604 |
| 2011/0258925 A1* | 10/2011 | Baker | 47/65.8 |
| 2011/0302837 A1* | 12/2011 | Chen | 47/65.8 |

FOREIGN PATENT DOCUMENTS

| | | |
|---|---|---|
| CN | 201326230 Y | 10/2009 |
| CN | 101575879 A | 11/2009 |
| EP | 0 347 966 A1 | 12/1989 |

* cited by examiner

ECOLOGICAL GREENING WALL AND CONSTRUCTION METHOD THEREOF

This application is a §371 of PCT/CN2010/073918, filed on Jan. 17, 2011 and claims priority from Chinese Patent Application No. 201010003029.7 2010, filed Jan. 1, 2010.

FIELD OF THE INVENTION

The present invention relates to an ecological greening wall and a construction method thereof, which is widely applicable to an infrastructural wall of house, an isolation barrier of highway, etc.

BACKGROUND OF THE INVENTION

Along with the fastened urbanization and the advanced industrialization, the ecological problem has become the focus of world's attention. At present, infrastructure construction increases gradually due to the fast and sustainable economy development, thus the conflict between the construction of, e.g., highway, house and soundproof walls and the ecological environment protection becomes increasingly significant because the current walls, such as a middle isolation barrier or side guardrails of highway and infrastructural walls of house, are mostly constructed through cement casting or metal bridge joint, for example. As such, these walls increase ambient temperature and noise, and greening of the walls is difficult and expensive and cannot achieve the desired effect. Therefore, the applicant brings forward an ecological wall, for the purposes of heat insulation, sound insulation, greening and environment protection.

SUMMARY OF THE INVENTION

In view of the disadvantages in the prior art, an object of the invention is to provide an ecological greening wall and a construction method thereof, and the wall has advantages of a simple structure and functions of heat and sound insulation, and is integrally stable, easy to construct and beneficial to greening and environment protection.

To achieve the above object, technical solutions below are provided in the invention.

An ecological greening wall includes: multiple fixed poles arranged uprightly on the ground separately; a reinforcement part with holes fixedly connected between the fixed poles along a longitudinal direction of the fixed poles; multiple vegetation bags stacked from bottom to top on one side of the reinforcement part closely against the reinforcement part; and construction parts built on the other side of the reinforcement part closely against the reinforcement part; where the vegetation bag includes a ventile and water-permeable bag body and plant growing material filled in the bag body; the bag body and the reinforcement part are fixedly connected together by an interposed reinforcing wall body, and the reinforcing wall body extends through the holes of the reinforcement part to the other side of the reinforcement part to fixedly connect with the construction parts, so that the reinforcement part, the reinforcing wall body, the construction parts and the vegetation bags are incorporated integrally. The construction part may be a brick, a cement board, a wooden board, a plastic panel or a metal plate, and the reinforcement part is a reinforcing net, a plate or a geogrid and may be made of plastic or metal. To joint the vegetation bags strongly the bag bodies of the adjacent vegetation bags may be connected through an interposed reinforcing layer or an interposed connecting buckle.

A construction method of above ecological greening wall includes the following steps of:

(1) separately arranging multiple fixed poles uprightly on the ground at a construction site, with a reinforcement part with holes being fixedly connected and tensioned between the fixed poles along a longitudinal direction of the fixed poles;

(2) stacking vegetation bags from bottom to top on one side of the reinforcement part and building construction parts on the other side of the reinforcement part, wherein said vegetation bag includes a ventile and water-permeable bag body and plant growing material filled in the bag body;

(3) after stacking every one or more layers of the vegetation bags, filling adhesive between the construction parts and the vegetation bags, so that the adhesive penetrates through the holes of the reinforcement part to adhere between the construction parts and the bag bodies; and (4) after the stacking of the vegetation bags is completed, obtaining a reinforcing wall body from hardening of the adhesive, so that the reinforcement part, the reinforcing wall body, the construction parts and the vegetation bags are incorporated integrally.

An ecological greening wall includes: multiple fixed poles arranged uprightly on the ground; a reinforcement part with holes fixedly connected between the fixed poles along a longitudinal direction of the fixed poles; and multiple vegetation bags stacked from bottom to top on both sides of the reinforcement part closely against the reinforcement part; wherein the vegetation bag includes a ventile and water-permeable bag body and plant growing material filled in the bag body; the vegetation bags on both sides of the reinforcement part and the reinforcement part are fixedly connected together by a reinforcing wall body interposed between the vegetation bags and the reinforcement part, and the reinforcing wall body penetrates the holes of the reinforcement part and fixedly connects with the vegetation bags on both sides of the reinforcement part respectively, so that the reinforcement part, the reinforcing wall body and the vegetation bags on both sides of the reinforcement part are incorporated integrally. The bag bodies of the adjacent vegetation bags may be connected through an interposed reinforcing layer or an interposed connecting buckle. A construction method of this ecological greening wall includes the following steps of:

(1) separately arranging multiple fixed poles uprightly on the ground at a construction site, with a reinforcement part with holes being fixedly connected and tensioned between the fixed poles along a longitudinal direction of the fixed poles;

(2) stacking vegetation bags from bottom to top on both sides of the reinforcement part, wherein said vegetation bag includes a ventile and water-permeable bag body and plant growing material filled in the bag body;

(3) after stacking every one or more layers of vegetation bags on both sides of the reinforcement part, filling adhesive between the vegetation bags of the both sides, so that the adhesive penetrates through the holes of the reinforcement part to adhere to the bag bodies of the vegetation bags of the both sides respectively;

(4) after the stacking of the vegetation bags is completed, obtaining a reinforcing wall body from the hardening of the adhesive, so that the reinforcement part, the reinforcing wall body and the vegetation bags are incorporated integrally Cement mortar or glue may be selected as the adhesive.

The advantages of the invention include that: the fixed poles are used to tension the corresponding reinforcement part, to enable the stacking of vegetation bags for planting and greening on at least one side of the reinforcement part, and the reinforcement part is integrally jointed to the vegetation bags through the reinforcing wall body. Thus, an integrally stable ecological greening wall with a simple structure and functions of heat and sound insulation is formed, and the wall is easy to construct, beneficial to greening and environment protection, and widely applicable to the infrastructural wall of house, the middle isolation barrier and both side guardrails of highway, a soundproof wall of trestle, etc.

Figure 1:
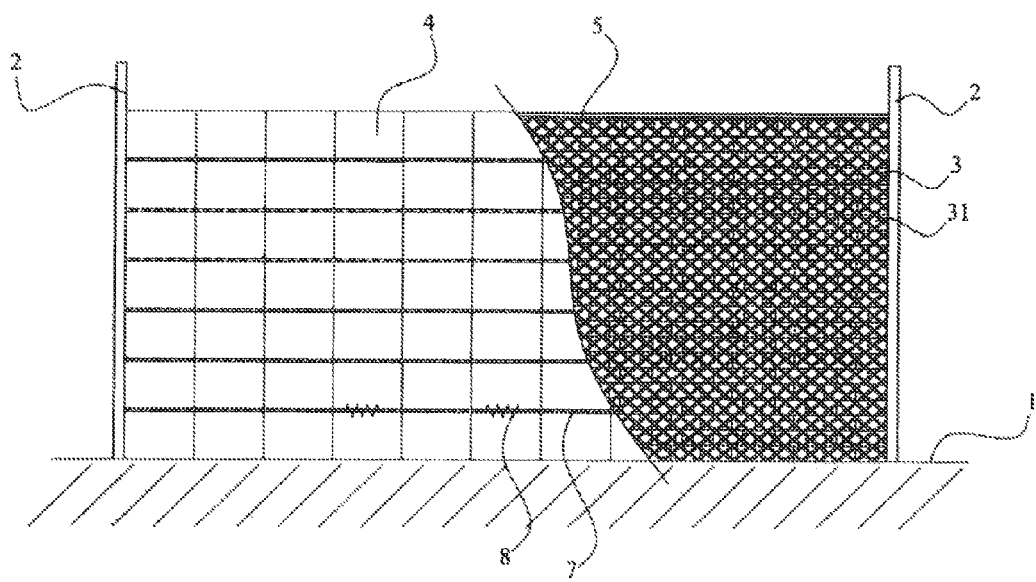
FIG. 1 is a schematic diagram showing the structure of an ecological greening wall according to a first embodiment of the invention.
Figure 2:
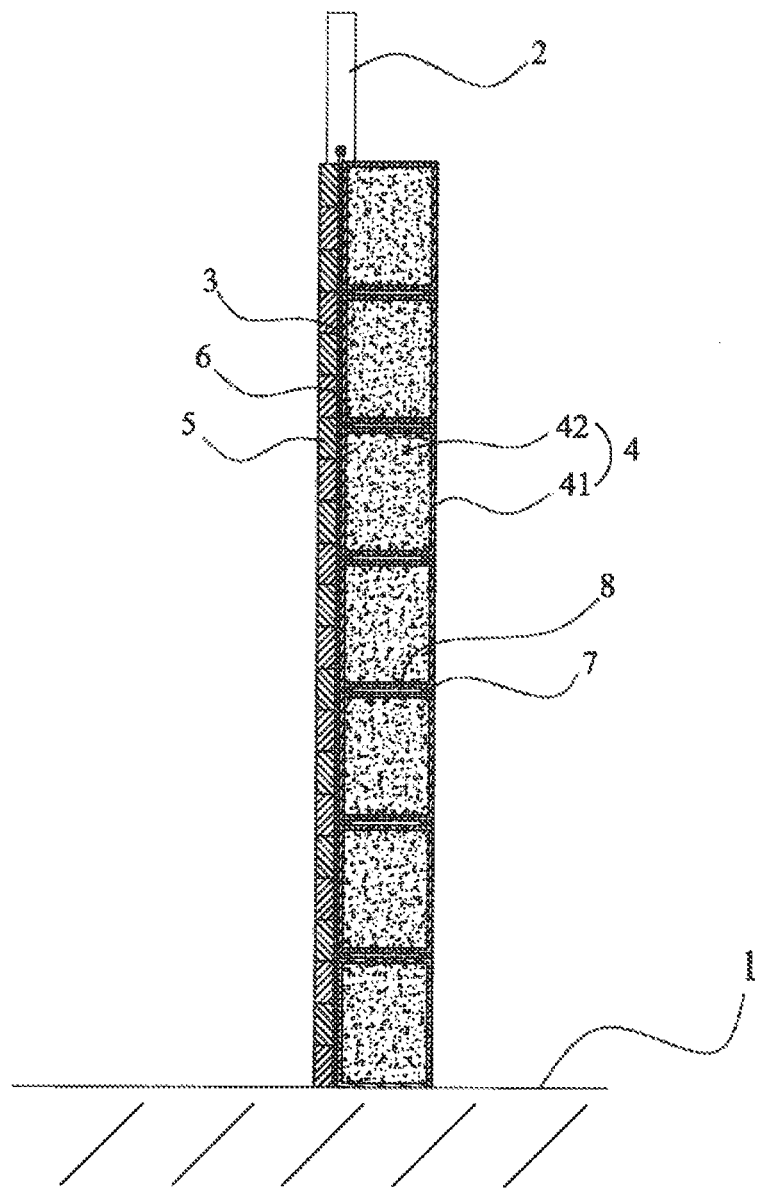
FIG. 2 is a schematic diagram showing a longitudinal section of the wall in FIG. 1.
Figure 3:
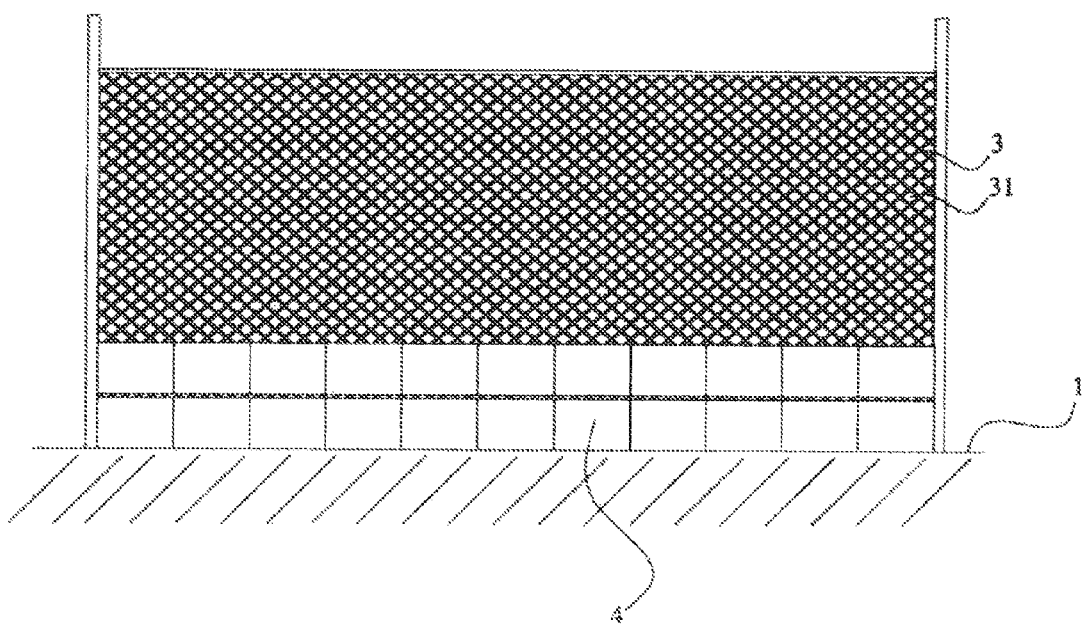
FIG. 3 is a schematic diagram showing a stacking process of the wall of the invention.
Figure 4:
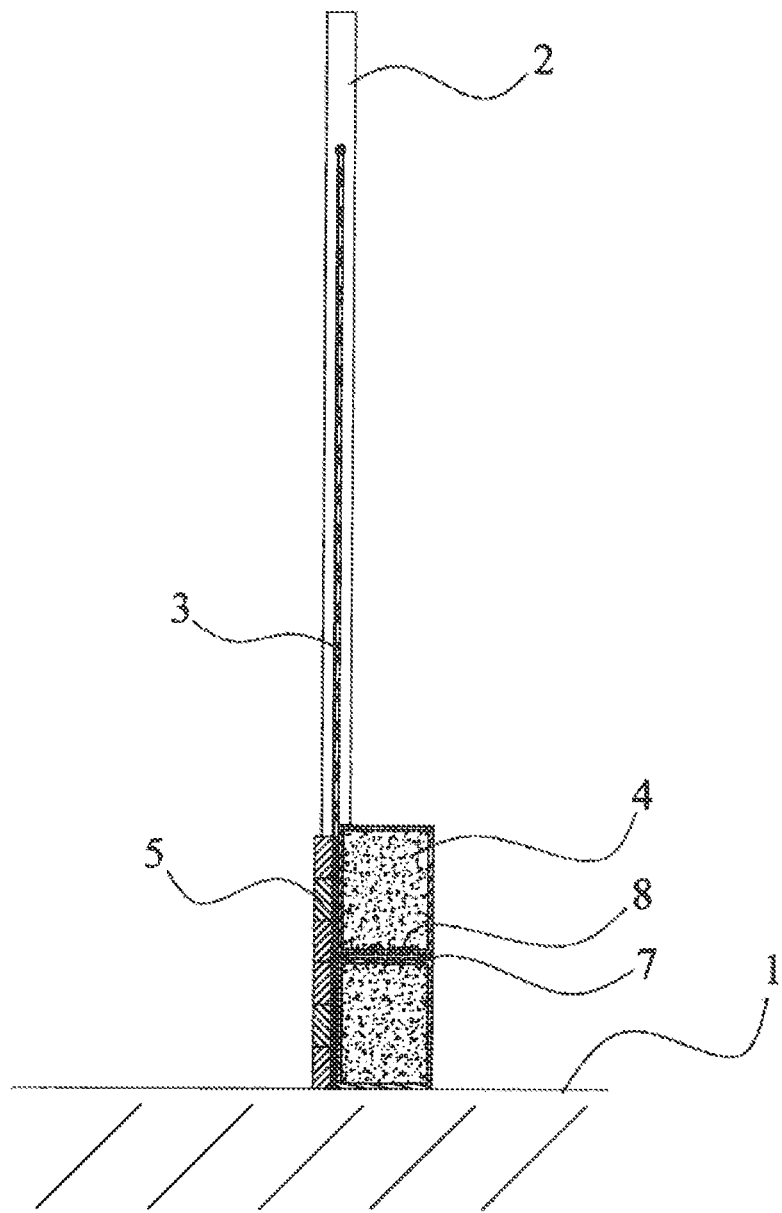
FIG. 4 is a schematic diagram showing a longitudinal section of the wall in FIG. 3.

| List of reference numerals | |
|---|---|
| 1: Ground; | 2: Fixed pole |
| 3: Reinforcement part; | 31: Hole |
| 4: Vegetation bag | 41: Bag body |
| 42: Plant growing material | |
| 5: Construction part | |
| 6: Reinforcing wall body | |
| 7: Reinforcing layer | |
| 8: Connecting buckle | |

DETAILED DESCRIPTION OF THE EMBODIMENTS

The invention is further described in detail below referring the drawings and the detailed description of embodiments.

As shown in FIGS. 1-4, an ecological greening wall includes multiple fixed poles 2 arranged uprightly on the ground 1 separately. The fixed poles 2 may be made of, e.g., steel or concrete. The fixed poles 2 may be fixed by standing on the ground or being planted into the ground, which is not limited herein. A reinforcement part 3 with holes 31 is fixedly connected between the fixed poles 2 along the longitudinal direction of the fixed poles 2, for tensioning construction parts and vegetation bags mentioned below, to enhance the overall strength. The reinforcement part 3 may be a reinforcing net, plate or geogrid. The reinforcement part 3 may be made of plastic or metal, which is not limited herein. On one side of the reinforcement part 3, multiple vegetation bags 4 are stacked from bottom to top closely against the reinforcement part 3, and on the other side of the reinforcement part 3, construction parts 5, which may be bricks, are built closely against the reinforcement part 3. The vegetation bag 4 includes a ventile and water-permeable bag body 41 and plant growing material 42 filled in the bag body 41. The bag body 41 may also be filled with absorbent material, for example. The bag body 41 and the reinforcement part 3 are attached together by a reinforcing wall body 6 which may be of material such as cement and gel. The reinforcing wall body 6 extends through the holes 31 of the reinforcement part 3 to the side opposite to the bag body 41 to fixedly connect with the construction parts 5, such that the reinforcement part 3, the reinforcing wall body 6, the construction parts 5 and the vegetation bags 4 are incorporated integrally. For jointing vegetation bags 4 more tightly, a reinforcing layer 7 of; e.g., glue or cement and a connecting buckle 8 are provided between the bag bodies 41 from the adjacent layer of vegetation bags 4. The connecting buckle 8 includes protrusions on both its top and bottom sides and the protrusions can penetrate into the bag bodies 41.

A construction method of the embodiment is described below. Firstly, multiple fixed poles 2 are arranged uprightly on the ground 1 at a construction site separately, while a reinforcement part 3 with holes 31 is fixedly connected between the adjacent fixed poles 2 along the longitudinal direction of the fixed poles 2 and tensioned tightly by the fixed poles 2. Then vegetation bags 4 are stacked from bottom to top on one side of the reinforcement part 3, and construction parts 5 (e.g., bricks) are built on the other side of the reinforcement part 3. When every one or more layers of vegetation bags 4 are stacked, as in the state shown in FIGS. 3-4, adhesive which may be cement mortar or glue is filled between the construction parts 5 and the vegetation bags 4, so that the adhesive penetrates through the holes 31 of the reinforcement part 3 to adhere between the construction parts 5 and the vegetation bags 4. After the stacking of the vegetation bags is completed, a reinforcing wall body 6 is formed by the hardening of the adhesive, thus the reinforcement part 3, the reinforcing wall body 6, the construction parts 5 and the vegetation bags 4 are incorporated integrally. In the embodiment, the reinforcement part 3 holds the vegetation bags 4, so that the vegetation bags 4 are stacked more stably. Greening of the vegetation bags can be implemented, thereby obtaining effects of heat and sound insulation. The method is applicable to the conventional house wall, a bounding wall, side guardrails of highway and soundproof walls of a trestle.

Figure 5:
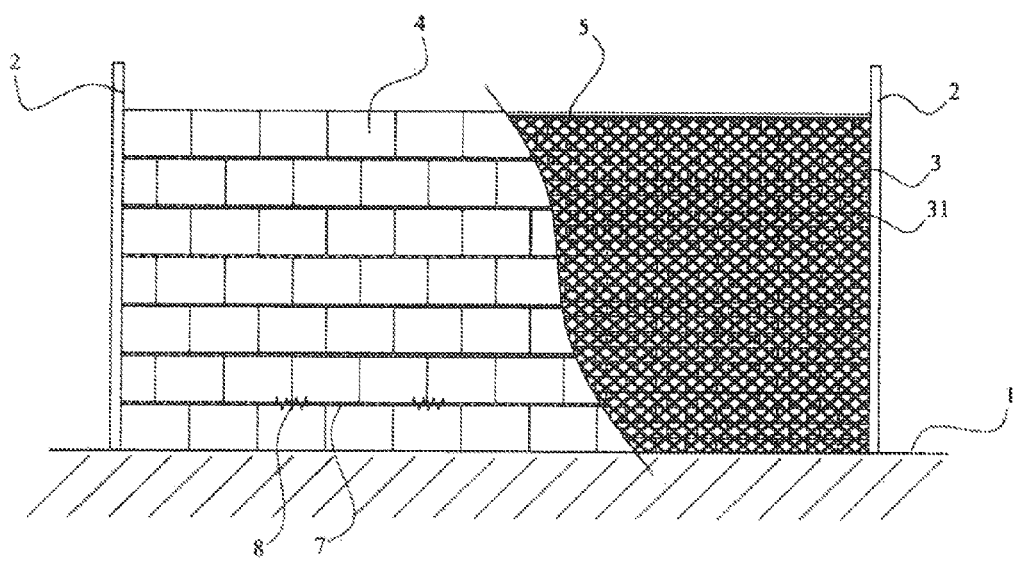
FIG. 5 is a schematic diagram showing the structure of an ecological greening wall according to a second embodiment of the invention.
Figure 6:
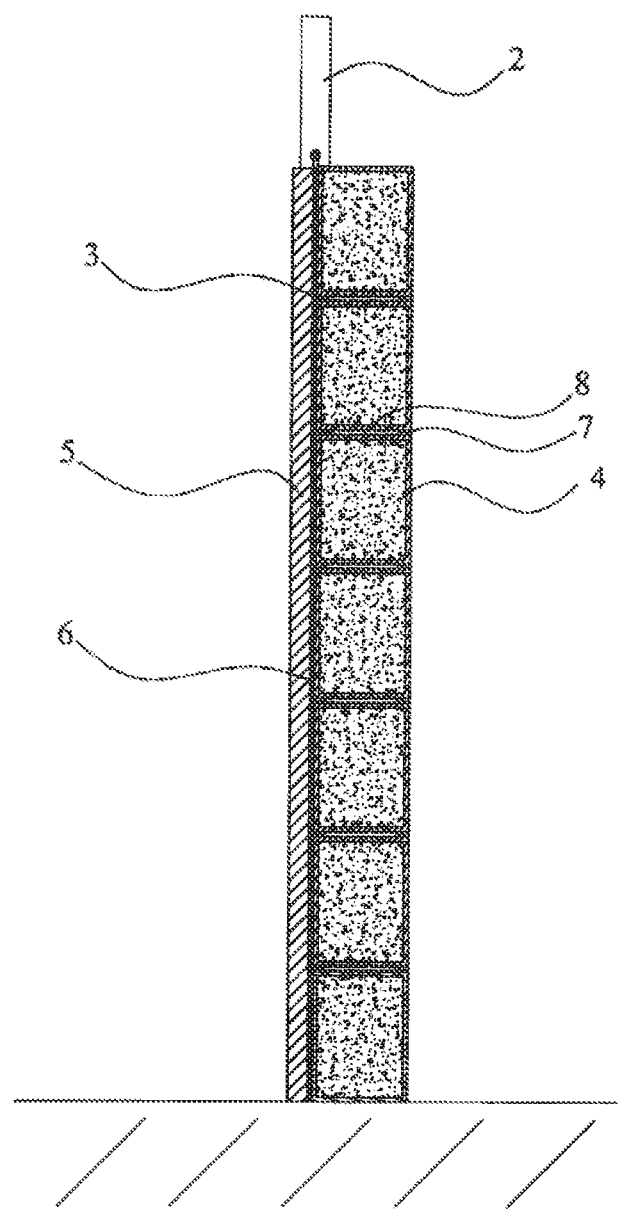
FIG. 6 is a schematic diagram showing the longitudinal section of the wall according to the second embodiment of the invention.

Another embodiment of the invention is shown in FIG. 5 and is similar with the embodiment already described above, except that the vegetation bags 4 stacked on one side of the reinforcement part 3 are arranged staggeringly, and the adjacent layers of the vegetation bags 4 are fixedly connected by a reinforcing layer 7 (which may be of glue or cement) or a connecting buckle 8. FIG. 6 shows a further embodiment which merely differs from the above embodiments in that the construction parts 5 (e.g. bricks) on the other side of the reinforcement part 3 are replaced by a cement hoard, a metal plate, a plastic panel or a wooden board. The other construction elements, such as the fixing pole 2, the reinforcement part 3, the vegetation bag 4, the reinforcing wall body 6, the reinforcing layer 7 and the connecting buckle 8, and the construction method remain unchanged.

Figure 7:
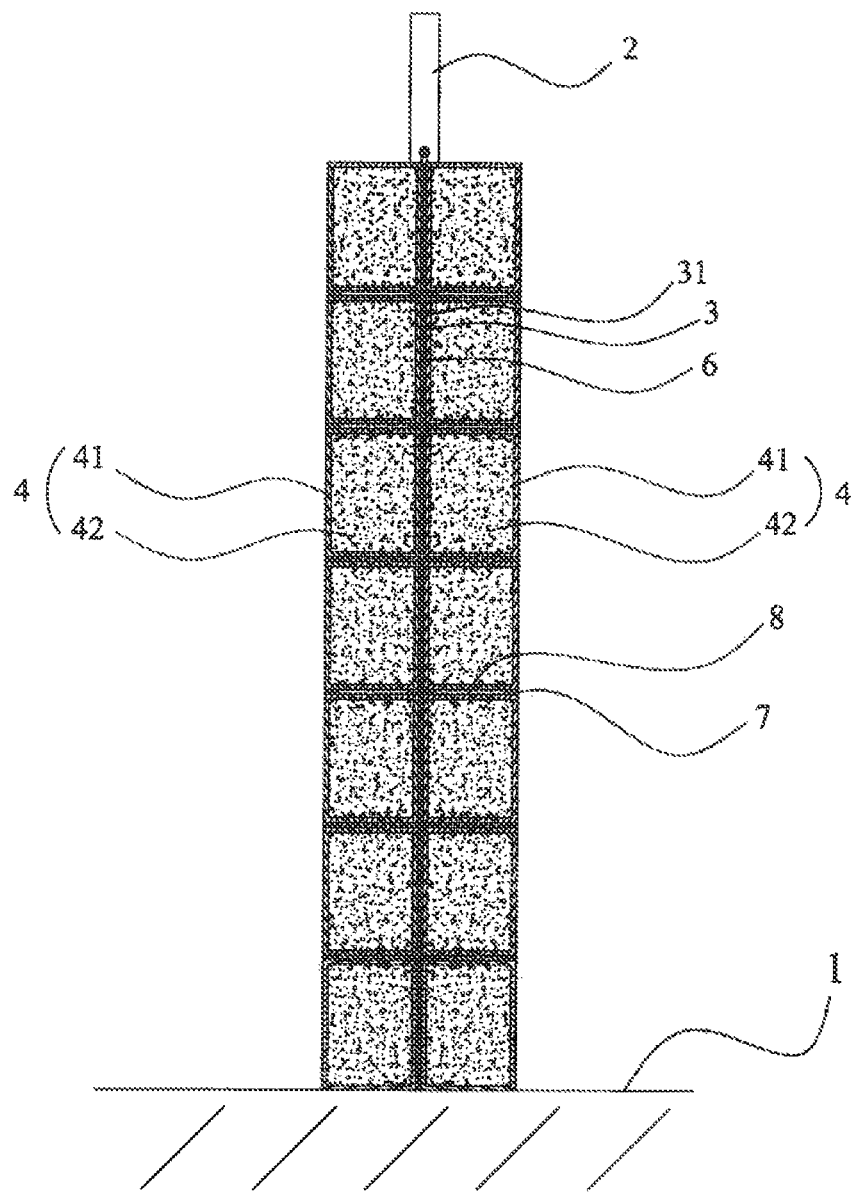
FIG. 7 is a schematic diagram showing the longitudinal section of an ecological greening wall according to a third embodiment of the invention.

FIG. 7 illustrates a further embodiment of the invention. Here, an ecological greening wall includes multiple upright fixed poles 2 on the ground 1. A reinforcement part 3 with holes 31 is fixedly connected between the adjacent fixed poles 2 along the longitudinal direction of the fixed poles 2. Multiple vegetation bags 4 are stacked from bottom to top on both sides of the reinforcement part 3 tightly against the reinforcement part 3. The vegetation bag 4 includes a ventile and water-permeable bag body 41 and plant growing material 42 filled in the bag body 41. The bag body 41 may also be filled with absorbent material. The reinforcement part 3 and the vegetation bags 4 of its both sides are fixedly connected together by a reinforcing wall body 6, which penetrates through the holes of the reinforcement part 3 and are fixedly connected with the bag bodies 41 of the vegetation bags 4 on both sides of the reinforcement part 3, respectively, so that the reinforcement part 3, the reinforcing wall body 6 and the vegetation bags 4 on both sides of the reinforcement part 3 are incorporated integrally. Likewise, a reinforcing layer 7, which may be of glue or cement, and/or a connecting buckle 8 is provided between bag bodies 41 of adjacent vegetation bags 4, for the enhanced joint of adjacent vegetation bags 4.

A construction method of this embodiment is described below. Firstly, the fixed poles 2 are arranged uprightly on the ground 1 at a construction site separately, while a reinforcement part 3 with holes 31 is fixedly connected between the adjacent fixed poles 2 along the longitudinal direction of the fixed poles 2 and tensioned tightly by the fixed poles 2. Then vegetation bags 4 are stacked layer by layer from bottom to top on both sides of the reinforcement part 3. A reinforcing layer 7 obtained from the hardening of glue or cement, and optionally a connecting buckle 8, is provided between and fixedly connects the vegetation bags 4 of the adjacent layers. When the stacking of every one or more layers of vegetation bags 4 on both sides of the reinforcement part 3 is completed, adhesive is filled between vegetation bags 4 of the both sides, so that the adhesive penetrates through the holes 31 of the reinforcement part 3 to adhere between the bag bodies 41 of the vegetation bags 4 of the both sides. After the stacking of the vegetation bags 4 is completed, a reinforcing wall body 6 is obtained from the hardening of the adhesive, thus the reinforcement part 3, the reinforcing wall body 6 and the vegetation bags 4 are incorporated integrally. In the embodiment, the reinforcing wall bodies 6 on both sides of the reinforcement part 3 are used to hold the vegetation bags 4, so that the vegetation bags 4 are stacked more stably. Greening of the vegetation bags 4 can be implemented, thereby obtaining effects of heat and sound insulation. The method is applicable to the conventional house wall, the middle isolation barrier of highway, etc.

The invention is characterized in that the fixed poles are used to tension the corresponding reinforcement part, to enable the stacking of vegetation bags for planting and greening on at least one side of the reinforcement part, and the reinforcement part is integrally jointed to the vegetation bags through the reinforcing wall body, so as to implement greening based on the vegetation bags. Thus, an integrally stable ecological greening wall with a simple structure and functions of heat and sound insulation is formed, and the wall is easy to construct, beneficial to greening and environment protection, and widely applicable to the infrastructural wall of house, the middle isolation huller and both side guardrails of highway, a soundproof wall of trestle, etc.

Although the invention has been described with reference to some preferred embodiments thereof, various amendments, variations and equivalents shall occur to those ordinarily skilled in the art and fall within the scope of the invention.

The invention claimed is:

1. An ecological greening wall, characterized by comprising:
    multiple fixed poles arranged uprightly on the ground separately;
    a reinforcement part with holes fixedly connected between the fixed poles along a longitudinal direction of the fixed poles;
    multiple vegetation bags stacked from bottom to top on one side of the reinforcement part closely against the reinforcement part; and
    construction parts built on the other side of the reinforcement part closely against the reinforcement part;
    wherein the vegetation bag includes a ventile and water-permeable bag body and plant growing material filled in the bag body; the bag body and the reinforcement part are fixedly connected together by an interposed reinforcing wall body, and the reinforcing wall body extends through the holes of the reinforcement part to the other side of the reinforcement part to fixedly connect with the construction parts, so that the reinforcement part, the reinforcing wall body, the construction parts and the vegetation bags are incorporated integrally.

2. The wall of claim 1, wherein said construction part is a brick, a cement board, a wooden board, a plastic panel or a metal plate, and said reinforcement part is a reinforcing net, a plate or a geogrid.

3. The wall of claim 1, wherein bag bodies of the adjacent vegetation bags are connected through an interposed reinforcing layer or an interposed connecting buckle.

4. The wall of claim 1, wherein said reinforcement part is a reinforcing net, a plate or a geogrid.

5. A construction method of the ecological greening wall of claim 1, characterized by comprising steps of:
    (1) separately arranging multiple fixed poles uprightly on the ground at a construction site, with a reinforcement part with holes being fixedly connected and tensioned between the fixed poles along a longitudinal direction of the fixed poles;
    (2) stacking vegetation bags from bottom to top on one side of the reinforcement part and building construction parts on the other side of the reinforcement part, wherein said vegetation bag includes a ventile and water-permeable bag body and plant growing material filled in the bag body;
    (3) after stacking every one or more layers of the vegetation bags, filling adhesive between the construction parts and the vegetation bags, so that the adhesive penetrates through the holes of the reinforcement part to adhere between the construction parts and the bag bodies; and
    (4) after the stacking of the vegetation bags is completed, obtaining a reinforcing wall body from hardening of the adhesive, so that the reinforcement part, the reinforcing wall body, the construction parts and the vegetation bags are incorporated integrally.

6. The method of claim 5, wherein the adhesive is cement mortar or glue.

7. An ecological greening wall, characterized by comprising:
    multiple fixed poles arranged uprightly on the ground;
    a reinforcement part with holes fixedly connected between the fixed poles along a longitudinal direction of the fixed poles; and
    multiple vegetation bags stacked from bottom to top on both sides of the reinforcement part closely against the reinforcement part;
    wherein the vegetation bag includes a ventile and water-permeable bag body and plant growing material filled in the bag body; the vegetation bags on both sides of the reinforcement part and the reinforcement part are fixedly connected together by a reinforcing wall body interposed between the vegetation bags and the reinforcement part, and the reinforcing wall body penetrates the holes of the reinforcement part and fixedly connects with the vegetation bags on both sides of the reinforcement part respectively, so that the reinforcement part, the reinforcing wall body and the vegetation bags on both sides of the reinforcement part are incorporated integrally.

8. The wall of claim 7, wherein bag bodies of the adjacent vegetation bags are connected through an interposed reinforcing layer or an interposed connecting buckle.

9. A construction method of the ecological greening wall of claim 7, characterized by comprising steps of:
(1) separately arranging multiple fixed poles uprightly on the ground at a construction site, with a reinforcement part with holes being fixedly connected and tensioned between the fixed poles along a longitudinal direction of the fixed poles;
(2) stacking vegetation bags from bottom to top on both sides of the reinforcement part, wherein said vegetation bag includes a ventile and water-permeable bag body and plant growing material filled in the bag body;
(3) after stacking every one or more layers of vegetation bags on both sides of the reinforcement part, filling adhesive between the vegetation bags of the both sides, so that the adhesive penetrates through the holes of the reinforcement part to adhere to the bag bodies of the vegetation bags of the both sides respectively;
(4) after the stacking of the vegetation bags is completed, obtaining a reinforcing wall body from the hardening of the adhesive, so that the reinforcement part, the reinforcing wall body and the vegetation bags are incorporated integrally.

10. The method of claim 9, wherein the adhesive is cement mortar or glue.

\* \* \* \* \*